(12) United States Patent
Walczyk

(10) Patent No.: US 7,530,109 B2
(45) Date of Patent: May 5, 2009

(54) SYSTEMS AND METHODS FOR GENERATING SECURE DOCUMENTS FROM SCANNED IMAGES

(75) Inventor: Mathew J. Walczyk, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 824 days.

(21) Appl. No.: 11/106,626

(22) Filed: Apr. 15, 2005

(65) Prior Publication Data

US 2006/0236366 A1 Oct. 19, 2006

(51) Int. Cl.
*H04L 9/00* (2006.01)
*G06F 17/30* (2006.01)

(52) U.S. Cl. .................... 726/26; 726/1; 726/27
(58) Field of Classification Search .......... 726/1, 726/26–33
See application file for complete search history.

(56) References Cited

U.S. PATENT DOCUMENTS

| 5,720,036 A * | 2/1998 | Garfinkle et al. ............ 709/225 |
| 5,813,009 A * | 9/1998 | Johnson et al. ............. 707/100 |
| 2005/0144469 A1* | 6/2005 | Saitoh ........................ 713/189 |

* cited by examiner

*Primary Examiner*—Hosuk Song
(74) *Attorney, Agent, or Firm*—MH2 Technology Law Group LLP

(57) ABSTRACT

A system for preparing and securing a scanned document for use by an application may include a scanner configured to scan a document and a processor coupled to the scanner. The processor may be configured to determine a security profile to be assigned to the document based on a predefined workflow, apply the security profile to the document, and route an output document to an application. The output document includes the applied security profile based on the predefined workflow.

18 Claims, 4 Drawing Sheets

SYSTEMS AND METHODS FOR GENERATING SECURE DOCUMENTS FROM SCANNED IMAGES

TECHNICAL FIELD

This invention relates to document scanning systems and methods and, more particularly, to systems and methods for generating secure documents from scanned images.

BACKGROUND

Any discussion of the prior art throughout the specification should in no way be considered as an admission that such prior art is widely known or forms part of common general knowledge in the field.

The goal of knowledge management systems is to provide users with greater access and more efficient management of the information contained within the system. The advent of electronic media was seen as a boon to information management systems. With the increasing use of electronic media, the demise of paper as a communication medium seemed plausible. However, the promise of the "paperless" office has not yet come to pass. It is still true, for example, that almost all important documents are printed at least once during their life, because paper is still the most convenient medium for reading, annotating, and sharing documents. The combination printer/facsimile/copier room of a work group is a crossroads through which passes much of the relevant information embodied in documents. Indeed, many knowledge management systems have been focusing on ways to use both paper and electronic media.

Sometimes, documents being processed at the printer/facsimile/copier room need to be routed to one or more user accounts (e.g., email accounts), one or more output devices (e.g., printers, displays, etc), and/or one or more repositories (e.g., a database, memory, server, etc.). Depending on the type of document being processed, different destinations of the document may have different security access limits assigned to the document. For example, some destinations may have write access, others may only have read access, print access, secure print access, etc.

Conventional systems do not scan a document and apply a predefined security profile to the scanned document. Instead, in conventional systems, a document can be scanned and then manually opened in an application, for example, Microsoft Office or Adobe Acrobat, to have security attributes assigned. Such systems are labor-intensive and prone to error, thus resulting in high costs and inefficiencies.

It may be desirable to predefine a security policy via a workflow definition and to apply the security policy to a document image produced by a scanner before being used by another application. The scanned document image can then be routed to an application for use.

SUMMARY

According to various aspects of the invention, a system for preparing and securing a scanned document for use by an application may include a scanner configured to scan a document and a processor coupled to the scanner. The processor may be configured to determine a security profile to be assigned to the document based on a predefined workflow, apply the security profile to the document, and distribute an output document to an application. The output document includes the applied security profile based on the predefined workflow In accordance with various aspects of the invention, a method for preparing and securing a scanned document for use by an application may include receiving a scanned document and determining a security profile that is to be applied to the document based on a predefined workflow. The security profile specifies access limits to be applied to the document. The method may further include applying the security profile to the document and distributing an output document to an application. The output document has the applied security profile based on the predefined workflow.

According to various aspects of the invention, a method for preparing a searchable representation of a secured scanned document may include receiving a scanned document, extracting keywords from the scanned document, and generating an unsecure, searchable representation of the scanned document. The searchable representation includes the extracted keywords. The method may further include determining a security profile to be assigned to the scanned document; generating an output document comprising the searchable portion and a secure portion, and distributing the output document to a repository. The secure portion is secured according to the security profile.

BRIEF DESCRIPTION OF THE DRAWINGS

The accompanying drawings, which are incorporated in and form part of the specification, illustrate various aspects of the present invention and, together with the description, describe those various aspects. Throughout the drawings, like numbers are used to represent like parts.

DETAILED DESCRIPTION

The following detailed description is provided to facilitate an understanding of some of the innovative features unique to the present invention. A full appreciation of the various aspects of the invention can only be gained by taking the entire specification, claims, drawings, and abstract as a whole.

Figure 1:
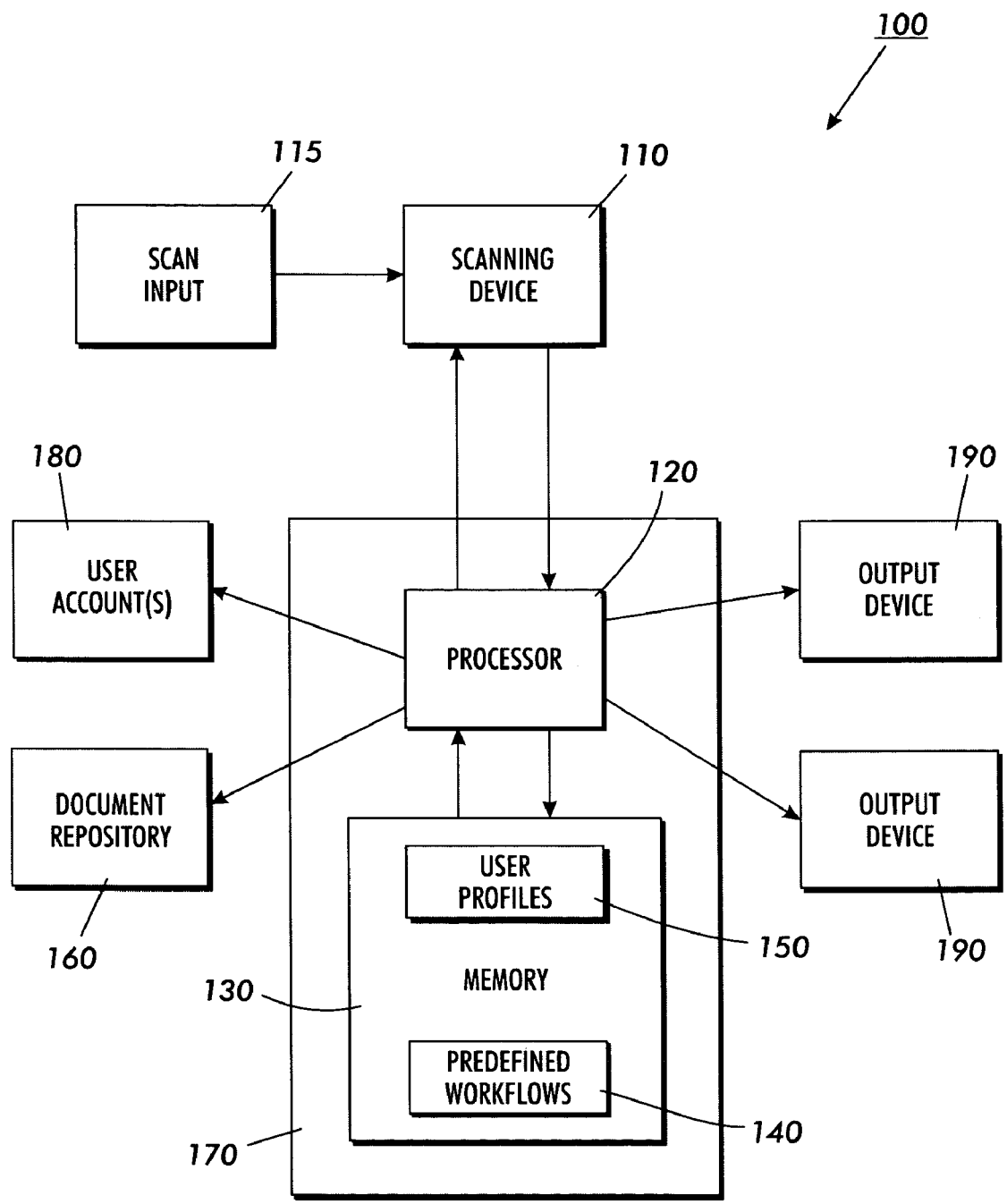
FIG. 1 is a block diagram of an exemplary system for preparing and securing a scanned document in accordance with various aspects of the invention.
Figure 2:
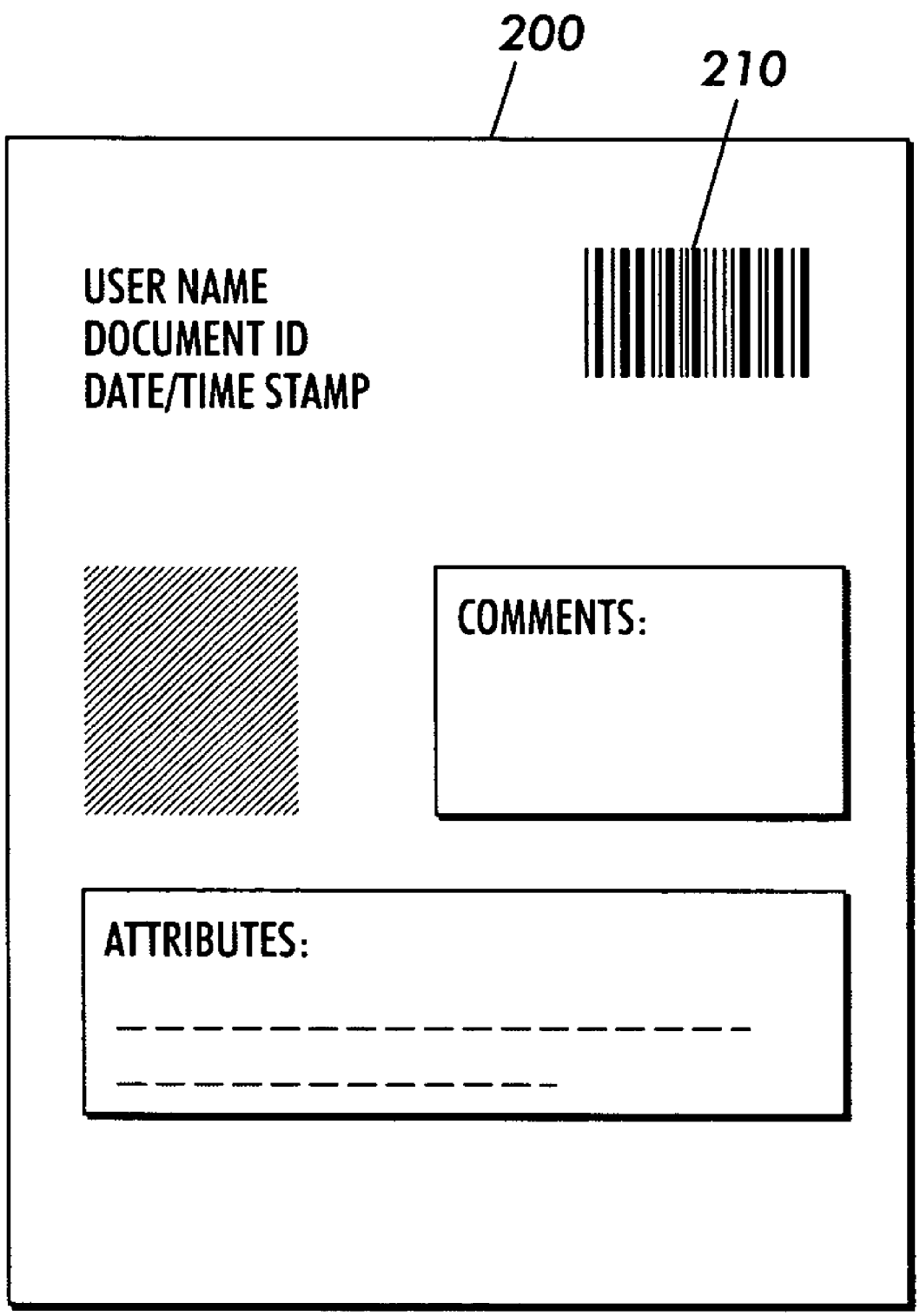
FIG. 2 is a diagram of an exemplary cover sheet for use with the exemplary system of FIG. 1.

Referring to the drawings and in particular to FIG. 1, a system 100 for preparing and securing a scanned document according to various aspects the invention is shown. The system 100 may be referred to generally as a knowledge management system. The system 100 includes a scanning device 110 for electronically capturing an item or document existing as a hardcopy medium. The scanning device 110 may be a scanner, a multi-function device, or any device that includes the ability to scan a hardcopy medium. The scanning device 110 may be configured to receive an input from a user via a scan input 115. The scan input 115 may be, for example, a user interface of the scanning device 110 or an information sheet or template, for example, a cover sheet as shown in FIG. 2, associated with a scanned document.

The scanning device 110 is electronically coupled with a processor 120. The processor 120 may be electronically coupled to a memory 130, which may include a database of predefined workflows 140 and a database of user profiles 150. The system 100 may also include a document repository 160 electronically coupled to the processor 120. According to various aspects of the invention, the processor 120, the memory 130, and/or the document repository 160 may reside on the same server 170. It should be appreciated that one or more of the processor 120, the memory 130, and the document repository 160 may reside on different servers or on one or more personal computers.

The processor 120 may also be electronically coupled to one or more output devices 190 and/or user accounts 180. The output device 190 may include a printer, a display, etc., and the user account 180 may include, for example, an email account. The aforementioned elements of the system 100 may be electronically coupled via a wired connection, a wireless connection, or a combination thereof.

In operation, a user may scan a document into the system 100 via the scanning device 110, for example, a scanner, a multi-function device, or the like. The user may also input information via a scan input 115 that identifies a predefined workflow for processing and routing the scanned document. For example, predefined workflows may exist for various clients, a human resources staff, an accounting department, or the like. Consequently, everyone associated with a certain client, staff, department, project, etc. may be included in the corresponding predefined workflow and thus receive scanned documents routed to that workflow.

According to various aspects, the user may input the information identifying a predefined workflow via a user interface of the scanning device 110, and the information may be encoded, associated with the scanned document, and directed to the processor 120. For example, the interface may include menus that list various workflows selectable by the user.

According to various aspects, the user may input the information identifying a predefined workflow via an information sheet or template, for example, a cover sheet 200, as shown in FIG. 2. The cover sheet 200 may be scanned with the subject document. The cover sheet 200 may includes a readable code 210, for example, a bar code, which includes the information identifying a predefined workflow. The scan of the cover sheet 200, including the readable code 210, may be encoded, associated with the scanned document, and directed to the processor 120.

The processor 120 may read the encoded information/cover sheet and search the database of predefined workflows 140 to determine the predefined workflow being identified by the user. The processor 120 may also search the database of user profiles 150 to determine security access limits for users and/or output devices and/or a repository associated with the predefined workflow.

The processor 120 may determine a security profile to be applied to the document based on the predefined workflow identified by the information input by the user and the security access limits for users and/or output devices and/or a repository associated with the predefined workflow. The security profile specifies access limits to be applied to the document. For example, the security profile may comprise read only access, print only access, modify access, copy access, and/or secure print. Further, different users, output devices, or a repository may have the same or different access limits to the scanned document.

According to various aspects, the processor 120 may apply the security profile to all or a portion of the scanned document. For example, the scanned document may have an unsecure, searchable portion and a secure portion. The processor 120 may then route the document to one or more output devices and/or user accounts and/or a repository.

According to various aspects of the invention, the processor 120 may extract keywords from the scanned document before applying a security profile and output a document that includes an unsecure, searchable portion and an secure portion. Thus, the scanned document may be processed by an optical character recognition application before keywords can be extracted.

The searchable portion may comprise a searchable representation of the scanned document that includes the extracted keywords that contain enough information about the scanned document so as to make the document locatable, for example, in a database, without accessing the document itself. The security profile may be applied to the secure portion of the document, which may thus be rendered unsearchable by certain users, but is not applied to the searchable portion. The processor 120 may route an output document to a repository, an output device, and/or a user account. According to various embodiments, the processor 120 may route the output document to an output device, user account, or repository for use by the application.

Figure 3:
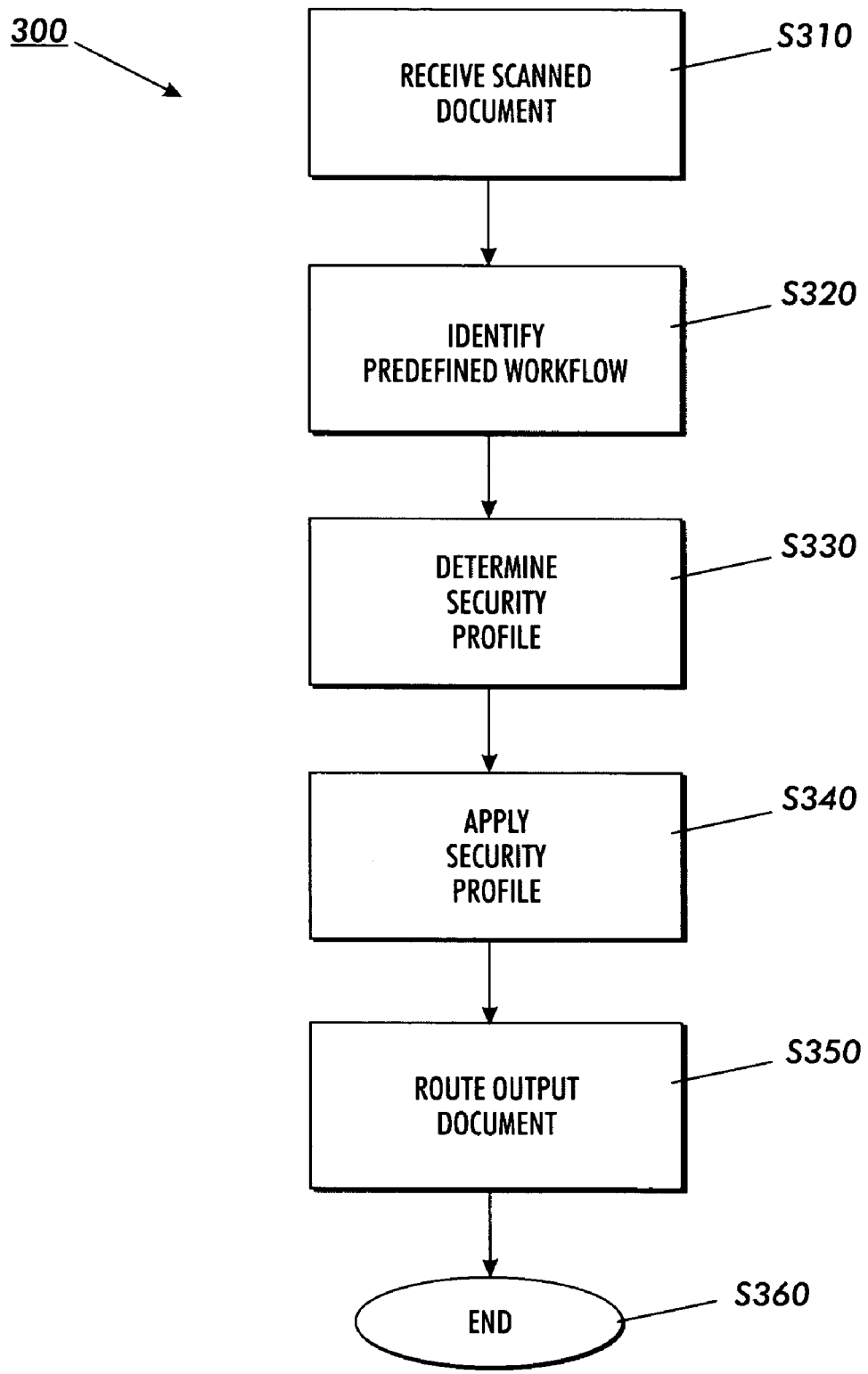
FIG. 3 is a flowchart illustrating an exemplary method for preparing and securing a scanned document in accordance with various aspects of the invention.

Referring now to FIG. 3, a flowchart illustrates an exemplary process 300 for preparing and securing a scanned document according to various aspects of the invention. The process commences at step S310 when the system 100 receives a scanned document. The scanned document includes information input by a user via the scan input 115, for example, a user interface of the scanning device 110 or an information sheet, for example, a cover sheet, associated with a scanned document. Control continues to step S320.

Next, in step S320, a predefined workflow for processing and routing the scanned document based on the information input by the user is identified. Control then continues to step S330 where a security profile that is to be applied to the document is determined based on the identified predefined workflow. The security profile specifies access limits to be applied to the document. For example, the security profile may comprise read only access, print only access, modify access, copy access, and/or secure print. Control continues to step S340.

Then, in step S340, the security profile is applied to the document, producing an output document having the applied security profile based on the predefined workflow. Control continues to step S350 where an output document is routed to an application for use by the application. For example, the scanned document may be routed to a user account, a repository, and/or an output device based on the predefined workflow. Control then proceeds to step S360 where the process ends.

According to various aspects, the exemplary process 300, described with respect to FIG. 3, may further include a step for extracting keywords from the scanned document and a step for generating an output document from the scanned document, wherein the output document may include a unsecure, searchable portion and a secure portion, which may not be searchable by all users. The searchable portion may comprise a searchable representation of the scanned document that includes the extracted keywords. These additional steps are described below in connection with the exemplary process of FIG. 4.

Figure 4:
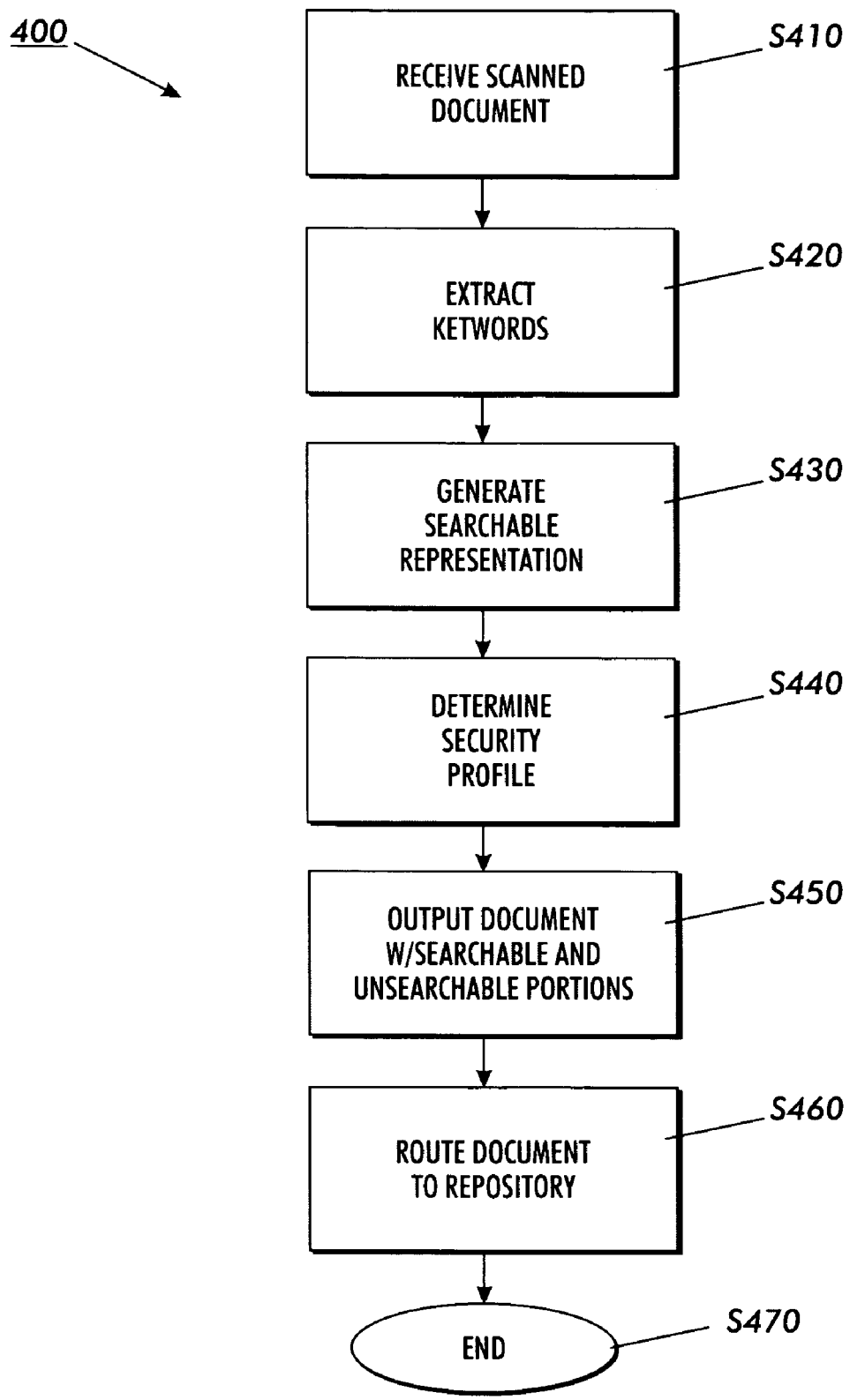
FIG. 4 is a flowchart illustrating an exemplary method for preparing a searchable representation of a secured scanned document.

Referring now to FIG. 4, a flowchart illustrates an exemplary process 400 for preparing a searchable representation of a secured scanned document according to various aspects of the invention. The process commences at step S410 when the system 100 receives a scanned document. The scanned document includes information input by a user via the scan input 115, for example, a user interface of the scanning device 110 or an information sheet, for example, a cover sheet, associated with a scanned document. Control continues to step S420.

In step S420, keywords are extracted from the scanned document. The keywords are representative of the content of the scanned document. Control then continues to step S430 where a searchable representation of the scanned document is generated. The searchable representation includes the extracted keywords. Control continues to step S440.

Next in step S440, a security profile to be assigned to the scanned document is determined. According to various aspects of the invention, the security profile may be determined based on a predefined workflow for processing and routing the scanned document. The predetermined workflow may be based on information input by a user, as described more fully above with respect to the exemplary process illustrated by FIG. 3. Control then continues to step S450.

In step S450, a document is outputted comprising the unsecure, searchable representation and a secure portion, which may not be searchable by all users. The secure portion is secured according to the security profile. Next, control continues to step S460 where the outputted document is routed to at least a repository. The outputted document may also be routed to one or more output devices and/or one or more user accounts. Control then proceeds to step S470 where the process ends.

It should be appreciated that various steps of exemplary process 300 may be implemented in exemplary process 400, and vice versa.

The novel features of the present invention will become apparent to those of skill in the art upon examination of the disclosure or can be learned by practice of the present invention. It should be understood, however, that the detailed description of the invention and the specific examples presented, while indicating certain embodiments of the present invention, are provided for illustration purposes only, because various changes and modifications will become apparent to those of skill in the art from this disclosure.

What is claimed is:

1. A system for preparing and securing a scanned document for use by an application, said system comprising:
    a scanner configured to scan a document; and
    a processor coupled to the scanner, the processor being configured to determine a security profile to be assigned to the document based on a predefined workflow, apply the security profile to the document, extract keywords from the document, and route an output document to an application,
    wherein the output document includes the applied security profile based on the predefined workflow, and wherein the output document comprises an unsecure, searchable portion and a secure portion, the searchable portion comprising a searchable representation of the scanned document based on the extracted keywords.

2. The system of claim 1, further comprising a multi-function device, the multi-function device comprising the scanner.

3. The system of claim 1, wherein the processor is configured to retrieve the predefined workflow based on information received from a user that identifies the predefined workflow.

4. The system of claim 1, wherein the processor is configured to retrieve the predefined workflow from a template, the template comprising a portion of the scanned document.

5. The system of claim 1, wherein the processor is configured to route the scanned document to at least one destination that is specified in the predefined workflow, the destination including at least one of a user account, a repository, and an output device.

6. The system of claim 1, wherein the security profile comprises at least one of read only access, print only access, modify access, copy access, and secure print.

7. A method for preparing and securing a scanned document for use by an application, said method comprising:
    receiving a scanned document;
    determining a security profile that is to be applied to the document based on a predefined workflow, the security profile specifying access limits to be applied to the document;
    applying the security profile to the document;
    extracting keywords from the document when the document is being scanned: and
    routing an output document to an application, the output document having the applied security profile based on the predefined workflow, and wherein the output document comprises an unsecure, searchable portion and a secure portion, the searchable portion comprising a searchable representation of the scanned document that includes the extracted keywords.

8. The method of claim 7, wherein determining the security profile comprises:
    receiving information from a user; and
    identifying the predefined workflow based on the received information.

9. The method of claim 7, wherein
    determining the security profile comprises: determining when the scanned document includes a template; and
    identifying the predefined workflow based on information contained in the template.

10. The method of claim 7, wherein said routing comprises routing the scanned document to at least one of a user account, a repository, and an output device based on the predefined workflow.

11. The method of claim 7, wherein the security profile comprises at least one of read only access, print only access, modify access, copy access, and secure print.

12. A recording medium having computer executable program code for the method of processing a document as claimed in claim 7.

13. A method for preparing a searchable representation of a secured scanned document, said method comprising:
    receiving a scanned document;
    extracting keywords from the scanned document;
    generating an unsecure searchable representation of the scanned document, the searchable representation including the extracted keywords;
    determining a security profile to be assigned to the scanned document;
    outputting a document comprising the searchable representation and a secure portion, the secure portion being secured according to the security profile; and
    routing the outputted document to a repository.

14. The method of claim 13, wherein the security profile comprises at least one of read only access, print only access, modify access, copy access, and secure print.

15. The method of claim 13, wherein the security profile is determined based on a predefined workflow, the security profile specifying access limits to be applied to the document, the method further comprising:
    routing the outputted document to an application, the outputted document having the applied security profile based on the predefined workflow.

16. The method of claim 15, wherein determining the security profile comprises:
  receiving information from a user; and
  identifying the predefined workflow based on the received information.

17. The method of claim 15, wherein determining the security profile comprises:
  determining when the scanned document includes a template; and
  identifying the predefined workflow based on information contained in the template.

18. The method of claim 13, wherein said routing comprises routing the scanned document to at least one of a user account and an output device based on the predefined workflow.

* * * * *